3,310,456
COMPOSITE ACRYLONITRILE FIBER DYEABLE WITH BOTH ACID AND BASIC DYESTUFFS AND METHOD OF MANUFACTURE
Yoshimasa Fujita and Keitaro Shimoda, Saidaiji, Okayama Prefecture, Japan, assignors to American Cyanamid Company, Stamford, Conn., a corporation of Maine
No Drawing. Filed Nov. 21, 1963, Ser. No. 325,490
Claims priority, application Japan, Dec. 5, 1962, 37/54,676
6 Claims. (Cl. 161—177)

This invention relates to an acrylonitrile polymer fiber or acrylic fiber which is dyeable with both acid and basic dyestuffs. More particularly, this invention relates to such a fiber wherein the affinity for acid dyestuffs and for basic dyestuffs is approximately equal and is sufficient for the production of fibers having sufficient intensity of color regardless of whether they are dyed with acid dyestuffs or basic dyestuffs. Additionally, the present invention relates to a method for producing such fibers.

As is well known, fibers made from acrylonitrile polymers are difficult to dye satisfactorily because of the poor affinity of such polymers to either acid dyestuffs or basic dyestuffs. In the past, several methods of improving the dyeability of such fibers have been proposed. One group of such methods comprises introducing a pyridine or other nitrogenous heterocyclic group into the fiber-forming acrylic polymer so as to render it receptive to acid dyestuffs. Another group of methods for improving the dyeability of acrylic fibers comprises introducing a carboxylic or sulfonic group to the fiber-forming acrylic polymer to make it dyeable with basic dyestuffs. It is immediately apparent, however, that fibers which have been made acid dyeable will not be receptive to basic dyes to a sufficient extent for satisfactory dyeing and that those fibers which have been rendered receptive to basic dyes will not be sufficiently receptive to acid dyes for satisfactory dyeing. Thus, while the aforesaid technique can produce fibers which are satisfactorily dyeable either with acid dyestuffs or with basic dyestuffs, none of these techniques will produce fibers which are satisfactorily dyeable with both types of dyestuffs.

The present invention has for its object the production of acrylic fibers which have sufficient affinity for both acid and basic dyestuffs to produce satisfactory dyeing with either type of dye and further to produce such fibers which have approximately equal affinity for both acid and basic dyestuffs, so that approximately equal dye pick-up will be achieved regardless of whether an acid dyestuff or a basic dyestuff is used.

This object, and other objects and advantages as will appear as the specification proceeds, is mainly achieved by producing a multi-component fiber comprising two components existing throughout the length of the fiber in separate zones with the two zones being intimately adhered to each other and each having a portion thereof defining a portion of the surface of the fiber. One of these components comprises an acrylic polymer containing at least 100 milliequivalents of acid dye receptive groups per kilogram of polymer combined in the acrylonitrile polymer and the other of these components contains at least 8 milliequivalents of basic dye receptive groups per kilogram of polymer combined in the acrylonitrile polymer. These lower limits are necessary to produce sufficient receptivity of the multi-component fiber to the acid dyes and the basic dyes. Additionally, the ratio of acid dye receptive groups in the one component to the basic dye receptive groups in the other component is between 8:1 and 14:1 and, preferably, is about 11:1, in order to provide substantially equal receptivity of the multi-component fiber to both the acid dyestuffs and the basic dyestuffs.

Usually, the receptivity of a fiber to dyestuffs is indicative of the degree of coloration which may be achieved by such fiber and is expressed in terms of the ratio of the weight of dyestuff absorbed in a standard test to the weight of the fiber. Such dye receptivity varies within a limited range according to the type of dyestuff used as well as according to dyeing conditions, but where a dyeing test such as the one described hereinafter is followed, the degree of coloration of the fiber so dyed may be divided into three categories, light (less than 1%), medium (1 to 2%), and dark (more than 2%). In order than any fiber may be of commercial value, it is necessary that such fiber be at least dyeable to a medium shade.

DYEING CONDITIONS FOR DYEABILITY TESTS (1) Dyeability test with an acid dyestuff Percent OWF
Arizarine Light Blue-4GL (Sandoz, acid dyestuff) ___ 20
Sulfuric acid (66 Bé.) _____ 4
Bath ratio 1:100.
Boiling for 90 minutes with the above bath ratio.

(2) Dyeability test with a basic dyestuff

Sevron Blue 5G (Du Pont, basic dyestuff) _____ 20
Acetic acid _____ 1
Bath ratio 1:100.
Boiling for 90 mintues with the above bath ratio.

(NOTE): Percent OWF denotes the percentage of the weight of absorbed dyestuff against the weight of fiber.

We have found that where a multi-component fiber is to be dyed to a medium or deeper shade, each of the components of such a fiber must have a dyeability at least double (i.e., at least 2%) the dyeability of a conventional monocomponent fiber which may be dyed in a medium shade, and that the above requirements are met only when the two components of said multi-component fiber have, in one component at least 100 milliequivalent of acid-dye receptive groups per kilogram polymer and, in the other component at least 8 milliequivalent of basic-dye receptive groups per kilogram polymer in the range of proportions of from 8:1 to 14:1.

There are various known apparatus useful for spinning the multi-component fibers of this invention. One example of such apparatus is the one described by Fujita et al. in U.S. patent application Ser. No. 208,884, filed July 10, 1962. Numerous other known apparatus are also useful and the particular apparatus used forms no part of the present invention.

The two dissimilar acrylic components of the multi-component fiber of this invention may be selected from the group consisting of acrylic copolymers, graft copolymers, and various mixtures and blends thereof. Each component should contain at least about 80% acrylonitrile in polymeric form.

For the acid dyeable component, use may be made of various unsaturated polymeric compounds containing basic nitrogen such as the various vinylpyridines, vinylpyrrolidone, vinylpiperidine, vinylcaprolactam, etc. Many such compounds are known to the prior art and are known for use in copolymers with acrylonitrile for the purpose of making such acrylic polymer acid dyeable. An extended list of typical vinylpyridines may be found in U.S. Patent No. 3,089,748.

For the basic dyeable component, use may be made of various unsaturated sulfonic acids or carboxylic acids. Illustrative of such acids are the various vinylsulfonic acids, allylsulfonic acids, methallysulfonic acid, styrenesulfonic acid, acrylic acids, methacylic acids, itaconic acids, etc.

Since many acid dye receptive and basic dye receptive monomers are known which are copolymerizable with acrylonitrile, the selection of any particular acid dye receptive or basic dye receptive monomer forms no part of this invention. Further illustrative lists of the known monomers for improving acid dyeability and basic dyeability of acrylic fibers are to be found in U.S. Patent 3,038,238 and in the patents referred to therein.

The present invention will be further illustrated and explained in terms of the following examples wherein all parts are by weight unless otherwise set forth.

Example 1

A series of acid dyeable polymers was prepared by copolymerizing 85% by weight of acrylonitrile with 15% by weight of mixtures of 2-methyl-5-vinylpyridine and vinyl acetate. The resulting fibers were dyed with an acid dyestuff under the previously described dyeing conditions and the results obtained are given in the following table:

| 2-methyl-5-vinylpyridine content (milliequivalent/kg. polymer) | 0 | 103 | 215 | 320 | 430 | 540 | 650 |
|---|---|---|---|---|---|---|---|
| Dyeability (percent OWF) | 0.5 | 2.3 | 4.4 | 6.1 | 7.8 | 9.5 | 10.2 |

Example 2

A series of basic dyeable polymers composed of 90% by weight of acrylonitrile and 10% by weight of a mixture of methacrylonitrile and sodium methallyl sulfonate was prepared. The resulting fibers were dyed with a basic dyestuff under the previously described dyeing conditions and the results are given in the following table:

| Sulfonic acid group content (milliequivalent/kg. polymer) | 8 | 16 | 26 | 36 | 46 | 56 | 76 |
|---|---|---|---|---|---|---|---|
| Dyeability | 2.0 | 4.0 | 5.3 | 6.7 | 9.3 | 12.5 | 16.8 |

It will be apparent from the results of Examples 1 and 2 that the sulfonic acid groups are much more effective in increasing the dyeability of acrylic fibers than are the pyridine groups. From this, it is apparent that, if a multi-component fiber is to have equal dyeability to acid dyes and to basic dyes in the two portions thereof, the acid dyeable portion should contain about 11 times as many pyridine groups as the basic dyeable portion contains of sulfonic acid groups. Since a deviation of about 20% in dyeability is permitted while still calling the two portions of the fiber "substantially equal" in dyeability, this leeway permits one to utilize between 8 and 14 times as many pyridine groups as sulfonic acid groups. Since, as previously pointed out, it is necessary for each component to have a dyeability of at least 2% in a multi-component fiber to produce a fiber dyeable to at least a medium shade, the fiber should contain at least 100 milliequivalent of pyridine groups and at least 8 milliequivalent of sulfonic acid groups per kilogram of polymer.

Example 3

Ten parts each of a copolymer (A) composed of 80% acrylonitrile, 13% vinyl acetate and 7% 2-methyl-5-vinylpyridine and a copolymer (B) composed of 90% acrylonitrile, 9.5% methyl acrylate and 0.5% sodium methallylsulfonate were separately dissolved in 90 parts of a 50% aqueous solution of sodium thiocyanate to prepare two dissimilar spinning solutions. By means of an apparatus connected with two metering pumps such as the one described in the aforesaid United States patent application Ser. No. 208,884, and now U.S. Patent 3,182,100, equal amounts of the solutions prepared above were extruded concurrently into a 10% aqueous solution of sodium thiocyanate at 0° C. After washing in water, the filament was stretched 8 times the original length in boiling water. The spinnerette nozzle used as above has 60 orifices, each 9.09 mm. in diameter. The filament was then dried in a highly humid atmosphere at a dry bulb temperature of 105° C. and a wet bulb temperature of 70° C. until the moisture content of the filament was reduced to 3%. The filament was treated in a relaxed state for 10 minutes in saturated water vapor at 120° C., followed by further drying at 80° C. for 20 minutes. As a control, 10 parts of a polymeric mixture containing equal parts of dry weight of said copolymer (A) and said copolymer (B) was dissolved in a 50% aqueous solution of sodium thiocyanate to prepare a spinning solution, which was then extruded, coagulated and after-treated in the same manner as described above to provide a monocomponent fiber. The two kinds of fibers prepared above were dyed under the aforementioned dyeing conditions. The results are summarized in the following table.

| Sample | Dyeability with acid dye | Dyeability with basic dye |
|---|---|---|
| This invention | 2.4 | 4.1 |
| Control | 1.6 | 1.0 |

Example 4

Ten parts each of a copolymer (C) composed of 85% acrylonitrile, 9% vinyl acetate, and 6% vinylpyridine and a copolymer (D) composed of 94% acrylonitrile, 5.5% methyl acrylate, and 0.5% sodium methallylsulfonate acid were separate dissolved in 90 parts of a 50% aqueous solution of calcium thiocyanate to prepare two dissimilar spinning solutions. By means of the same apparatus as described in Example 3, the solutions were extruded and, then, after-treated in the described manner to prepare a multi-component fiber. As a control, a monocomponent fiber was prepared from a polymeric mixture containing equal amounts of said copolymer (C) and said copolymer (D) according to the same spinning method as described in Example 3. These two fibers were dyed under the aforementioned conditions. The results are summarized in the following table.

| Sample | Dyeability with acid dye | Dyeability with basic dye |
|---|---|---|
| This invention | 7.4 | 2.9 |
| Control | 3.2 | 1.6 |

The multi-component fibers of this example had 23 coil crimps per linear inch.

We claim:
1. A multi-component fiber comprising a first acrylonitrile polymer component containing at least 8 milliequivalents of basic dye receptive groups per kilogram of polymer combined in the acrylonitrile polymer and a second acrylonitrile polymer component containing at least 100 milliequivalents of acid dye receptive groups per kilogram of polymer combined in the acrylonitrile polymer, the ratio of acid dye receptive groups in the second component to basic dye receptive groups in the first component being between 8:1 and 14:1; said two components existing in separate zones intimately adhered to each other throughout the length of said fiber with a portion of each of said zones defining a portion of the surface of said fiber.

2. A fiber as defined in claim 1 wherein the ratio of acid dye receptive groups in the second component to basic dye receptive groups in the first component is about 11:1.

3. A fiber as defined in claim 1 wherein said acid dye receptive groups contain pyridine units and wherein said basic dye receptive groups contain sulfonic units.

4. A fiber as defined in claim 1 wherein said acid dye receptive groups contain pyridine units and wherein said basic dye receptive groups contain carboxylic units.

5. A method of producing a multi-component fiber comprising concurrently extruding into a coagulating medium through a common orifice two dissimilar acrylonitrile polymer components, the first of said components comprising an acrylonitrile polymer component containing at least 8 milliequivalents of basic dye receptive groups per kilogram of polymer combined in the acrylonitrile polymer, the second of said components comprising an acrylonitrile polymer component containing at least 100 milliequivalents of acid dye receptive groups per kilogram of polymer combined in the acrylonitrile polymer, the ratio of acid dye receptive groups in the second component to basic dye receptive groups in the first component being between 8:1 and 14:1.

6. A process as defined in claim 5 wherein the ratio of acid dye receptive groups to basic dye receptive groups is about 11:1.

References Cited by the Examiner

UNITED STATES PATENTS

| | | | |
|---|---|---|---|
| 2,428,046 | 9/1947 | Sisson et al. | 264—171 XR |
| 2,688,012 | 8/1954 | Chaney et al. | 264—182 XR |
| 2,952,043 | 9/1960 | Uraneck et al. | 264—171 |
| 2,988,420 | 6/1961 | Ryan et al. | 161—177 XR |
| 3,026,287 | 3/1962 | Murdock et al. | 264—182 XR |
| 3,038,236 | 7/1962 | Breen | 161—177 XR |
| 3,038,237 | 6/1962 | Taylor | 161—177 XR |
| 3,038,238 | 6/1962 | Wu | 161—177 XR |
| 3,038,240 | 6/1962 | Kovarik | 161—177 XR |
| 3,039,524 | 6/1962 | Belk et al. | 264—182 XR |
| 3,092,892 | 6/1963 | Ryan et al. | 161—177 XR |
| 3,182,106 | 5/1965 | Fujita et al. | 264—182 XR |

ALEXANDER H. BRODMERKEL, *Primary Examiner.*

J. H. WOO, *Assistant Examiner.*